US009166945B1

(12) United States Patent
Roskind et al.

(10) Patent No.: US 9,166,945 B1
(45) Date of Patent: *Oct. 20, 2015

(54) CONTENT PROVIDED DNS RESOLUTION VALIDATION AND USE

(71) Applicant: Google Inc., Mountain View, CA (US)

(72) Inventors: James Roskind, Redwood City, CA (US); Mike Belshe, Saratoga, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/478,936

(22) Filed: Sep. 5, 2014

Related U.S. Application Data (63) Continuation of application No. 13/149,406, filed on May 31, 2011, now Pat. No. 8,832,283, which is a continuation-in-part of application No. 12/883,393, filed on Sep. 16, 2010.

(51) Int. Cl.
| | | |
|---|---|---|
| *G06F 21/00* | (2013.01) | |
| *H04L 29/12* | (2006.01) | |
| *G06F 21/56* | (2013.01) | |
| *G06F 21/51* | (2013.01) | |

(52) U.S. Cl.
CPC ............ *H04L 61/1511* (2013.01); *G06F 21/51* (2013.01); *G06F 21/56* (2013.01)

(58) Field of Classification Search
CPC ......... G06F 21/51; G06F 21/56; G06F 15/16; H04L 61/1511
USPC .......................................... 709/224, 225, 244
See application file for complete search history.

(56) References Cited

U.S. PATENT DOCUMENTS

| | | | |
|---|---|---|---|
| 2004/0039827 A1* | 2/2004 | Thomas et al. | 709/228 |
| 2005/0114367 A1 | 5/2005 | Serebrennikov | |
| 2006/0143703 A1* | 6/2006 | Hopen et al. | 726/15 |
| 2006/0184640 A1* | 8/2006 | Hatch | 709/217 |

(Continued)

OTHER PUBLICATIONS

David Pogue, "Simplifying the Lives of Web Users," The New York Times, http://www.nytimes.com/2010/08/19/technology/personaltech/19pogue.html, dated Aug. 18, 2010, 4 pages.

(Continued)

*Primary Examiner* — Chau Le
*Assistant Examiner* — Don Zhao
(74) *Attorney, Agent, or Firm* — Sterne, Kessler, Goldstein & Fox & Fox, P.L.L.C.

(57) ABSTRACT

Methods and systems for using and providing trustworthy DNS resolutions are provided. A method for using trustworthy DNS resolutions may include obtaining a DNS resolution listing for a domain name and validating the listing's plausibility using a plausible range list. The method may also include selecting a DNS resolution from the DNS resolution listing based on a requested host associated with the domain name. The method may further include initiating a connection to the host using the selected DNS resolution. A method for providing trustworthy DNS resolutions may include obtaining a plurality of potential DNS resolutions for a domain name. The method may also include generating a DNS resolution listing for a domain name and providing the DNS resolution listing. A system may include a DNS resolution selection module and a connection module. Another system may include a DNS resolution inquiry module and a DNS resolution listing provision module.

16 Claims, 11 Drawing Sheets

(56) References Cited

U.S. PATENT DOCUMENTS

| | | |
|---|---|---|
| 2006/0253454 A1* | 11/2006 | Coppola et al. ............... 707/10 |
| 2006/0253609 A1* | 11/2006 | Andreev et al. .............. 709/245 |
| 2007/0294419 A1 | 12/2007 | Ulevitch |
| 2008/0034211 A1* | 2/2008 | Shull et al. ................... 713/175 |
| 2008/0071616 A1 | 3/2008 | Hovnanian et al. |
| 2008/0072249 A1 | 3/2008 | Hovnanian et al. |
| 2008/0222307 A1 | 9/2008 | Bhakta et al. |
| 2008/0294711 A1* | 11/2008 | Barber ........................ 709/201 |
| 2009/0077383 A1* | 3/2009 | de Monseignat et al. ..... 713/175 |
| 2009/0287842 A1* | 11/2009 | Plamondon .................. 709/233 |
| 2010/0031078 A1 | 2/2010 | Foote et al. |
| 2010/0121953 A1* | 5/2010 | Friedman et al. ............ 709/224 |
| 2010/0274970 A1 | 10/2010 | Treuhaft et al. |
| 2011/0270964 A1* | 11/2011 | Huang et al. ................ 709/224 |
| 2011/0296486 A1* | 12/2011 | Burch et al. .................... 726/1 |

OTHER PUBLICATIONS

J. Levine, "An Efficient Method to publish Ranges of IP Addresses in the DNS," Internet Research Task Force, Internet-Draft, dated Dec. 28, 2010, 22 pages.

* cited by examiner

Conventional

CONTENT PROVIDED DNS RESOLUTION VALIDATION AND USE

CROSS REFERENCE TO RELATED APPLICATIONS

This application is a continuation of U.S. patent application Ser. No. 13/149,406, filed May 31, 2011, which is a continuation-in-part of U.S. patent application Ser. No. 12/883,393, filed Sep. 16, 2010, entitled "Trustworthy Provisioning of DNS Resolutions Within Web Content," both of which are incorporated by reference herein in their entirety.

BACKGROUND

1. Technical Field

Embodiments relate to applications and the World Wide Web.

2. Background Art

Web browsers may use a number of protocols and standards to obtain or manage content flow. Most browsers primarily use hypertext transfer protocol (HTTP) to fetch content and web pages. Web pages are located using a uniform resource locator (URL), which identifies where the web page may be found. Web pages may be retrieved using the Internet Protocol (IP) address of the computer holding the web page content. In order to be more memorable and human friendly, an IP address or hierarchy may be represented by a hostname (such as www.google.com). A hostname is a domain name that has one or more associated IP addresses. Hostnames and other information associated with domain names may be resolved or translated to IP addresses using the Domain Name System (DNS). This DNS resolution system is sometimes referred to as the "phone book" for the Internet.

DNS resolution requires either looking in a local computer cache for a DNS resolution or querying a set of DNS servers over the network. DNS utilizes authoritative DNS resolvers to help map domain names to IP addresses. Multiple DNS resolvers may be used in order to avoid having all the information in a single, central DNS server.

Figure 1:
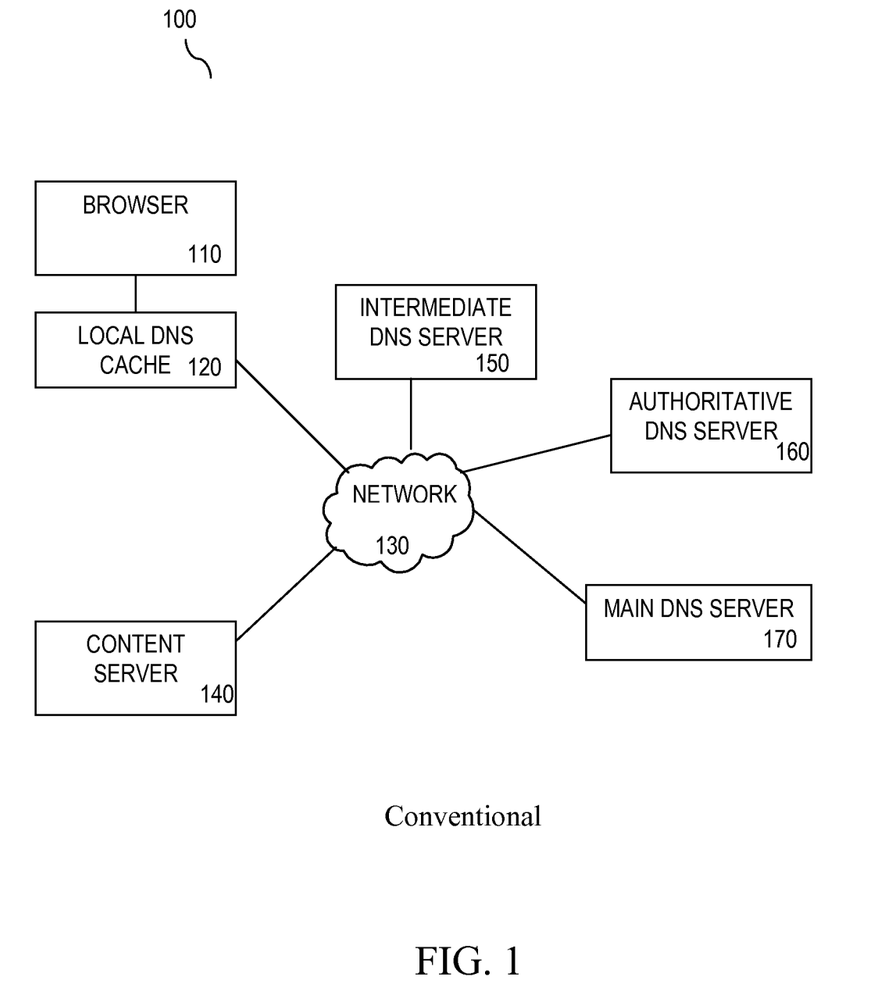
FIG. 1 is a diagram showing an existing system for DNS resolution.

DNS resolution may add extra latency, which can cause users some discomfort. FIG. 1 illustrates an exemplary system 100 that performs DNS resolution. When network traffic is required to connect to a content server 140 from browser 110, User Datagram Protocol (UDP) packets are sent to a DNS resolver, and eventually a UDP response is provided. If a DNS resolution is not selected from a local cache, such as DNS cache 110, DNS resolution is requested from internet intermediate DNS server 150, authoritative DNS server 160 or main DNS server 170 over network 130. There is a latency time required to request DNS resolution from a DNS server. For example, the latency cost for an HTTP page load is at least a) a DNS resolution; and b) a round trip to establish a TCP/IP connection. The latency cost for an HTTPS (secure HTTP) connection is a) a DNS resolution; b) a round trip to establish a TCP/IP connection; and c) a round trip to perform an SSL handshake and establish a shared key.

BRIEF SUMMARY

The embodiments described below include systems and methods for using trustworthy domain name system (DNS) resolutions. According to an embodiment, a method for using trustworthy DNS resolutions may include obtaining a DNS resolution listing for a domain name. The listing may include a plurality of potential DNS resolutions. The listing may be a bulk listing. The plausibility of the potential DNS resolutions may be validated using a plausible range list for the domain name. DNS resolutions that are validated as plausible are considered trustworthy DNS resolutions. Trustworthy DNS resolutions may be relied upon as being true DNS resolutions for a domain name. For instance, trusted DNS resolutions for SSL enabled web sites may be relied upon for initiating secure SSL connections. The method may also include selecting a DNS resolution from the DNS resolution listing based on a requested host associated with the domain name. The method may further include initiating a connection to the host using the selected DNS resolution. According to a further embodiment, the DNS resolution list is obtained without requesting DNS resolution for the domain name subsequent to identifying the domain name.

According to another embodiment, a method for providing trustworthy DNS resolutions may include obtaining a plurality of potential DNS resolutions for a domain name. The method may also include generating a DNS resolution listing for a domain name. The DNS resolution listing may include DNS resolutions from the plurality of potential DNS resolutions. The method may further include providing the DNS resolution listing. A connection to a host can be made using a DNS resolution selected from the provided DNS resolution listing.

According to an embodiment, a system for using trustworthy DNS resolutions may include a DNS resolution selection module configured to obtain a DNS resolution listing for a domain name. The listing may include a plurality of potential DNS resolutions. The DNS resolution selection module may also be configured to validate plausibility of the DNS resolution listing using a plausible range list for the domain name. The DNS resolution selection module may further be configured to select a DNS resolution from the DNS resolution listing based on a request for a host associated with the domain name. The system may also include a connection module configured to connect to a host with the selected DNS resolution.

According to another embodiment, a system for providing trustworthy DNS resolutions may include a DNS resolution inquiry module configured to obtain a plurality of potential DNS resolutions for a domain name. The system may also include a DNS resolution listing provision module configured to generate a DNS resolution listing for a domain name, wherein the DNS resolution listing includes DNS resolutions from the plurality of potential DNS resolutions. The DNS resolution listing provision module may also be configured to provide the DNS resolution listing. A connection to a host can be made using a DNS resolution selected from the provided DNS resolution listing.

Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments described herein refer to illustrations for particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

When a content provider provides a uniform resource locator (URL) that points to additional sites, a browser typically has to request a DNS resolution on the embedded host name prior to obtaining the content from the additional sites or subresources. To reduce latency, a content provider may provide a DNS resolution, or DNS to IP address translation, along with the host name. For security reasons, a browser cannot typically trust such a proposed resolution from a content provider. For instance, client use of a misstated or malicious resolution, beyond for example a handshake, could allow a client application to violate security policy and provide cookies for a misresolved domain to a server at the misstated IP address. However, if the URL is a secure HTTP (HTTPS) URL, then the DNS resolution can automatically be validated during the connection phase. As a result, embedding such translation hints in content can significantly reduce page load latency. Such a mechanism is trustworthy enough for SSL connectivity.

Latency may be reduced for content loaded from secondary domains. This may also apply to content of an HTTPS connection. The latency cost for an HTTPS connection may be as large as a) a DNS resolution; b) a round trip to establish a TCP/IP connection; and c) a round trip to perform an SSL handshake and establish a shared key. Embodiments described below may reduce the latency cost of an HTTPS connection to not more than: b) a round trip to establish a TCP/IP connection; and c) a round trip to perform an SSL handshake. Since the cost of a DNS resolution typically exceeds that of a round trip on a TCP/IP connection, subresource fetching from SSL enabled sites may be faster than HTTP connection fetching.

Figure 2:
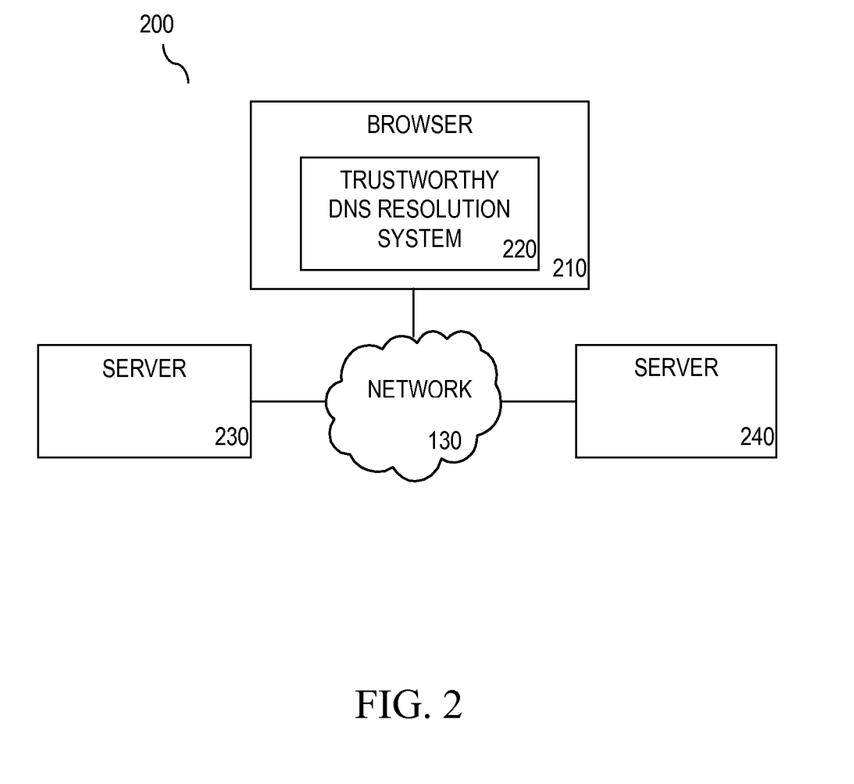
FIG. 2 is a diagram of a system for using trustworthy DNS resolutions, according to an embodiment.

FIG. 2 shows exemplary system 200 for using trustworthy DNS resolutions, according to an embodiment. System 200 shows browser 210 and trustworthy DNS resolution system 220, which may be used to connect to server 230 or server 240 over one or more networks 130. Browser 210 and trustworthy DNS resolution system 220 may be coupled directly or indirectly. According to an embodiment, browser 210 may include any device, application or module that enables a user or computer to navigate and/or retrieve data from another data source, typically over a network. Browser 210 may include any conventional web browser such as those that are widely available. Browser 210 may also be a multi-threading browser. According to a further embodiment, browser 210 may also be configured to use any number of protocols, including protocols such as HTTP, FTP, and underlying protocols such as TCP/IP or UDP. Network(s) 130 may be any type of data network or combination of data networks including, but not limited to, a local area network (LAN), a medium area network, or a wide area network such as the Internet. Browser 210 may also be configured to support or interact with any number of world wide web protocols, applications or services.

Browser 210 and/or resolver information system 220 may exist within or be executed by hardware in a computing device. For example, browser 210 and/or trustworthy DNS resolution system 220 may be software, firmware, or hardware or any combination thereof in a computing device. A computing device can be any type of computing device having one or more processors. For example, a computing device can be a workstation, mobile device (e.g., a mobile phone, personal digital assistant, or laptop), computer, game console, set-top box, kiosk, embedded system or other device having at least one processor and memory. A computing device may include a communication port or I/O device for communicating over wired or wireless communication link(s). Browser 210 and trustworthy DNS resolution system 220 may be located on the same or different computing devices.

According to an embodiment, browser 210 may be configured to connect to another server, such as server 230 or server 240. The connection may be a secure sockets layer (SSL) connection. Browser 210 may use a trusted DNS resolution received from trustworthy DNS resolution system 220 to connect to a domain name.

Figure 3:
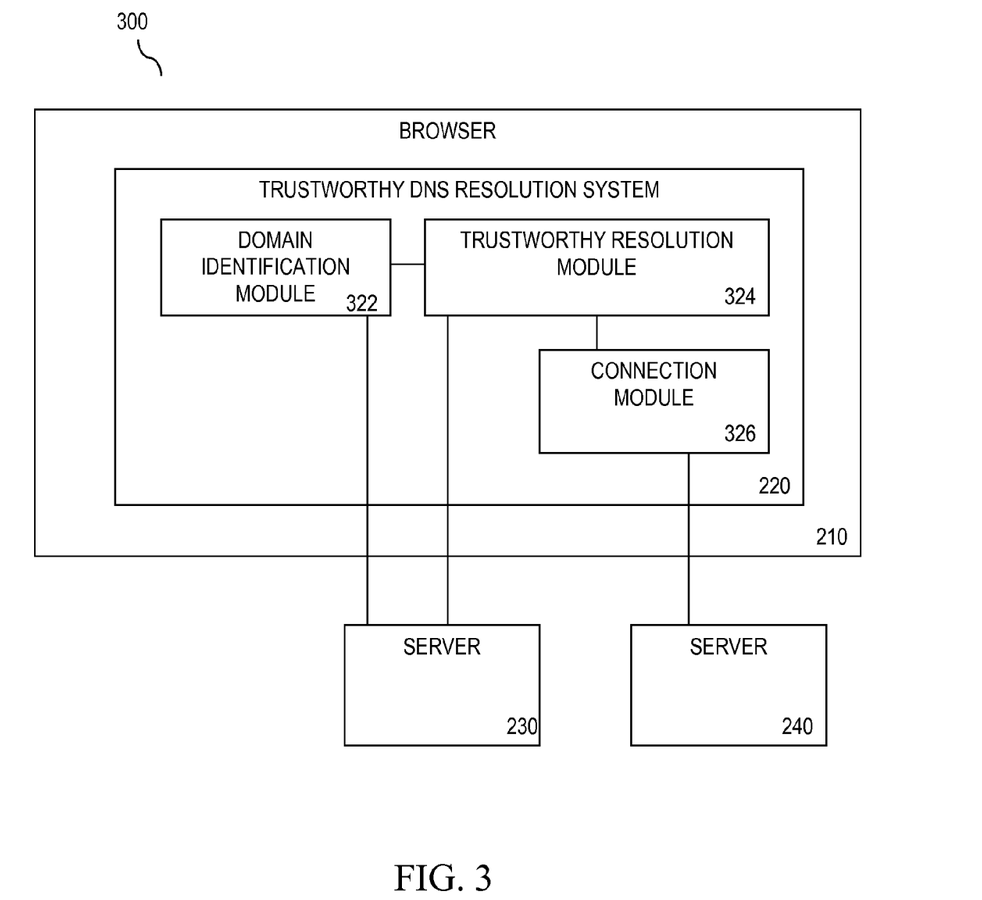
FIG. 3 is a diagram of a system for using trustworthy DNS resolutions, according to an embodiment.

FIG. 3 illustrates an exemplary system 300 for using trustworthy DNS resolutions, according to an embodiment. System 300 includes browser 210 and trustworthy DNS resolution system 220 that may connect to server 230 and/or server 240. Trustworthy DNS resolution system 220 may include domain identification module 322, trustworthy resolution module 324 and connection module 326. These components may be coupled together directly or indirectly.

According to an embodiment, domain identification module 322 may be configured to identify a domain name to be resolved. Domain identification module 322 may automatically identify proposed resolutions based on scanning or parsing of content. For example, a hypertext markup language (HTML) renderer may scan content and extract suggested DNS resolutions. In some cases, domain names to be resolved may be determined from a web page or search results. In other cases, domain names to be resolved may be received from another component or data source.

Trustworthy resolution module 324 may be configured to obtain and use DNS resolution information, according to an embodiment. DNS resolutions may be obtained without requesting DNS resolution from an operating system DNS cache, local DNS resolver, or a global DNS resolver for the domain name subsequent to identifying the domain name. In other words, a DNS resolution may have already been performed at some time earlier than when the domain name to be resolved is identified. In other cases, a DNS resolution may have been generated. An existing DNS resolution is obtained upon identification of the domain name to be resolved rather than requesting resolution after the domain name is identified. Trustworthy resolution module 324 may also be configured to determine whether a DNS resolution is trusted. Trustworthy resolution module 324 may automatically validate the trusted DNS resolution during a secure sockets layer (SSL) connection phase.

Trustworthy resolution module 324 may obtain DNS resolutions from web content, according to an embodiment. DNS resolutions may be obtained from or provided within a web page, such as a search page or a web page containing links. Resolutions may be contained in HTML, such as within an HTML tag field such as <link rel=resolution host=other.domain.com ips=1.2.3.4,9.8.7.6>. In this example, trustworthy resolution module 324 may parse or otherwise scan the HTML, and deduce that the host "other.domain.com" may have a DNS resolution of either "1.2.3.4" or "9.8.7.6". DNS resolutions may also be obtained from or provided within header content, such as within an HTTP header. For example, a header X-DNSRESOLUTIONS might contain one or more hostnames, and one or more DNS resolutions for each of those host names.

In other cases, DNS resolutions may be obtained from or provided from within HTML, such as an HTML tag field. DNS resolutions may also be provided by a scripting language, such as by calls made to global functions. For example, a call from JavaScript® code to a global function with code, such as SuggestResolution("other.domain.com", "1.2.3.4"), may provide a plausible DNS resolution. Embedded DNS resolutions may be obtained from or provided by a secure sockets layer (SSL) web link. In some embodiments, the embedded DNS resolutions provided may be for the domain that served the content. Resolutions may be used to re-connect to the server that provided the (presumably alternate) resolution for the domain that served the content. For example, the reconnection may be done using the embedded resolution even if the connection is not SSL based.

Trustworthy resolution module 324 may also obtain an embedded DNS resolution that is closer to a desired domain than a current DNS resolution or IP address for the domain name. For example, a server, such as server 230 may include a "better" IP address for use in future connection back to server 230, the original serving domain. "Better" may mean a server IP address that is closer to a user location, a user's internet provider, a user domain, a browser domain or a server domain. "Closer" may include geographically closer, topologically closer, closer in terms of round-trip-time, closer in terms of improved bandwidth or reliability connectivity, etc. A better or more desirable IP address can provide more responsive or lower latency responses to a user, based on network connectivity. For example, server 230 may serve the same content as server 240, but server 230 is closer and would lead to less latency. Even though a resolution for the domain name is currently an IP address to server 240, a better resolution would point to the IP address of server 230 for the domain name.

Connection module 326 may be configured to establish a connection to another host or server with an obtained or provided DNS resolution, according to an embodiment. An SSL connection may also be established. If a trusted DNS resolution is provided, connections to sub-resource servers for a domain name may be initiated. In some embodiments, a user application, such as browser 210, may rely on content-provided DNS resolutions to initiate connections to a host. In some cases, such embedded resolutions may be used only to initiate SSL connection, such as HTTPS content acquisitions. For example, connections to hosts via HTTP connection may ignore resolutions provided in content.

Figure 4:
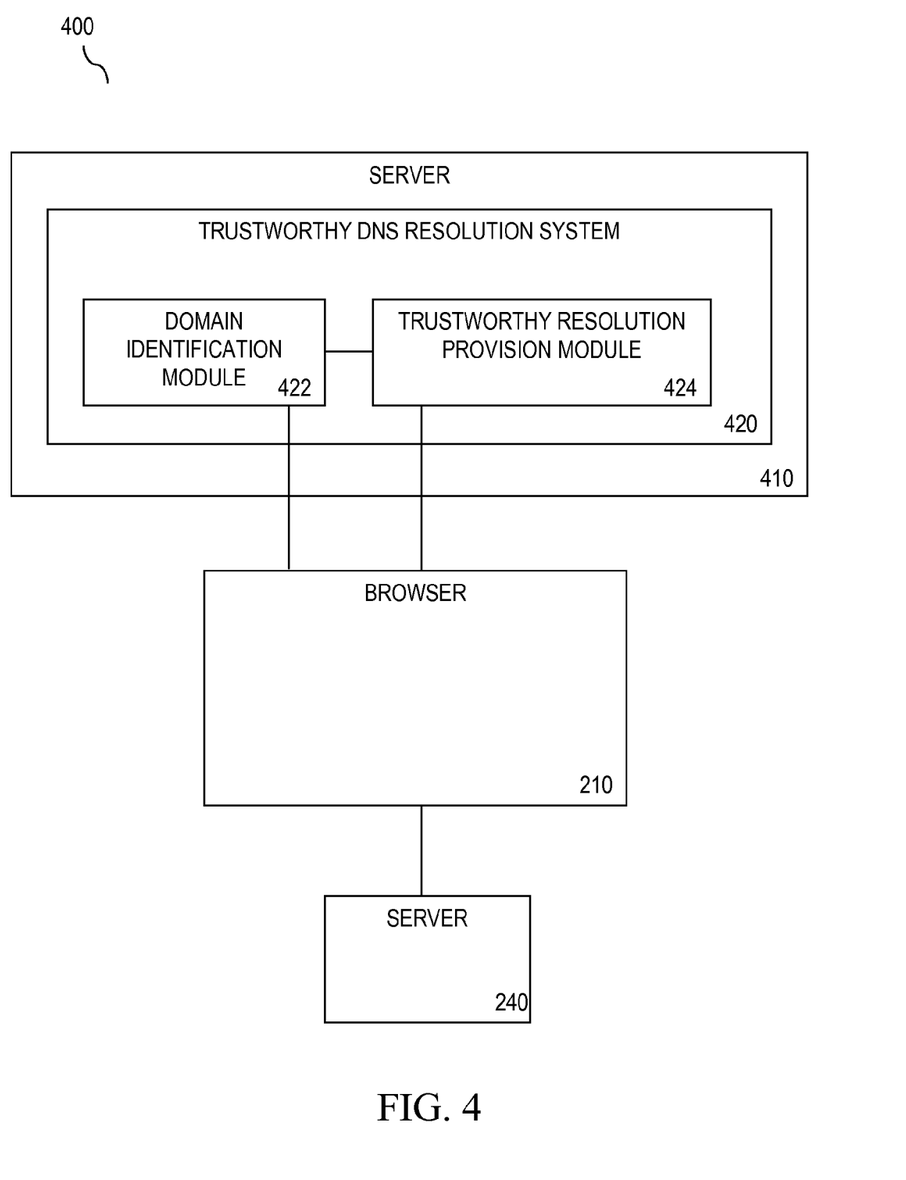
FIG. 4 is a diagram of a system for providing trustworthy DNS resolutions, according to an embodiment.

FIG. 4 illustrates an exemplary system 400 for providing trustworthy DNS resolutions, according to an embodiment. System 400 may include browser 210, coupled to server 410 and server 240. Server 410 may include trustworthy DNS resolution system 420, which may include domain identification module 422 and trustworthy resolution provision module 424. These components may be coupled together directly or indirectly. Domain identification module 422 may perform at least the functions of domain identification module 322.

Trustworthy resolution provision module 424 may be configured to provide trusted DNS resolutions in web content, as explained above. Trustworthy provision module 424 may obtain DNS resolutions form other data sources or the DNS resolution may be requested prior to identification of a domain name to be resolved. According to an embodiment, web servers, such as HTTP or HTTPS servers, may augment content by including one or more DNS resolutions with the content served as a page. Web search results that included SSL links may be augmented to provide possible IP addresses for given hosts.

In some embodiments extracted resolutions may be stored for possible future use, such as in DNS resolution records. Resolutions may be searched for when the need for a resolution has manifested itself. For example, a DNS resolution may be needed when a connection to a host is required, such as when a user clicks on a web link, or when a sub-resource of a page, such as an image, needs to be fetched. Expiration times may also be included with embedded DNS resolutions.

Figure 5:
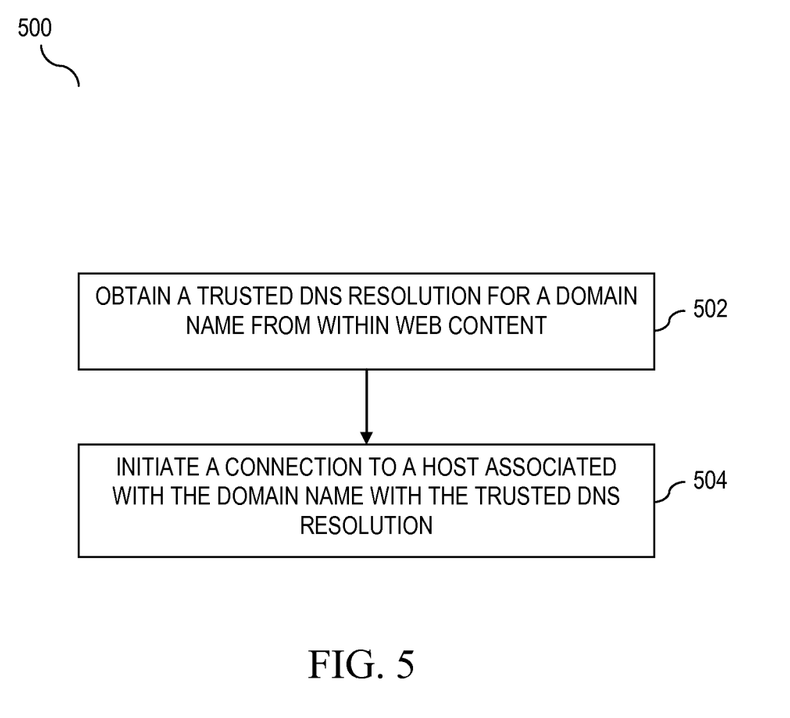
FIG. 5 is a flowchart illustrating a method for using trustworthy DNS resolutions, according to an embodiment.

FIG. 5 illustrates an exemplary method 500 for using trustworthy DNS resolutions, according to an embodiment. In step 502, a trusted DNS resolution may be obtained for a domain name from within web content. This step may be performed by trustworthy DNS resolution system 220. In some cases, the domain to be resolved may be identified or provided to trustworthy DNS resolution system 220.

In step 504, a connection to a host associated with the domain name may be initiated with the trusted DNS resolution. This step may be assisted by trustworthy DNS resolution system 220 or connection module 326.

Figure 6:
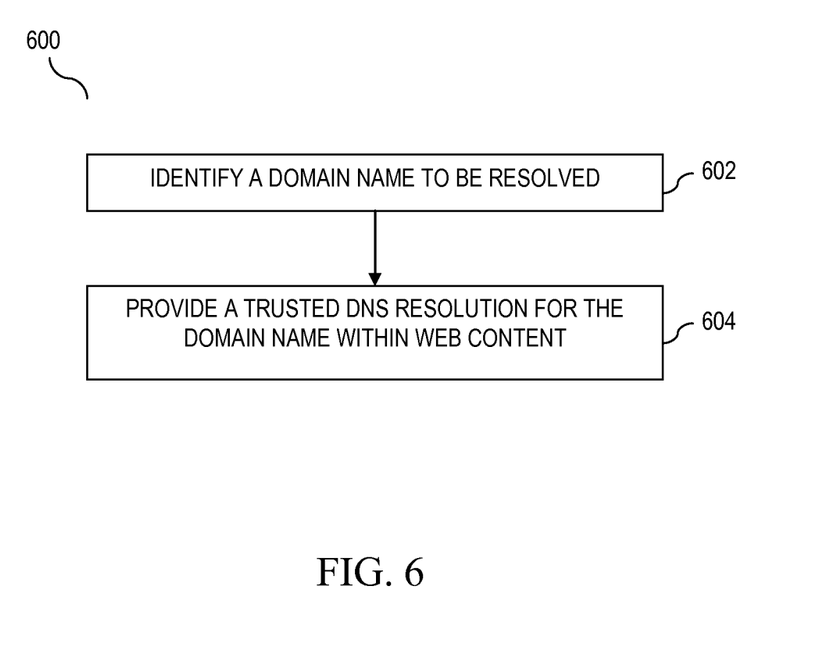
FIG. 6 is a flowchart illustrating a method for providing trustworthy DNS resolutions, according to an embodiment.

FIG. 6 illustrates an exemplary method 600 for providing trustworthy DNS resolutions, according to an embodiment. In step 602, a domain name to be resolved is identified. Domain identification may be performed by domain identification module 422.

In step 604, a trusted DNS resolution may be provided within web content. This step may be performed by trustworthy resolution provision module 424. A receiving component may then use the trusted DNS resolution to initiate a connection to a host associated with the domain name. The trusted DNS resolution may also be used in a SSL connection or for subresources requiring an SSL connection.

Figure 7:
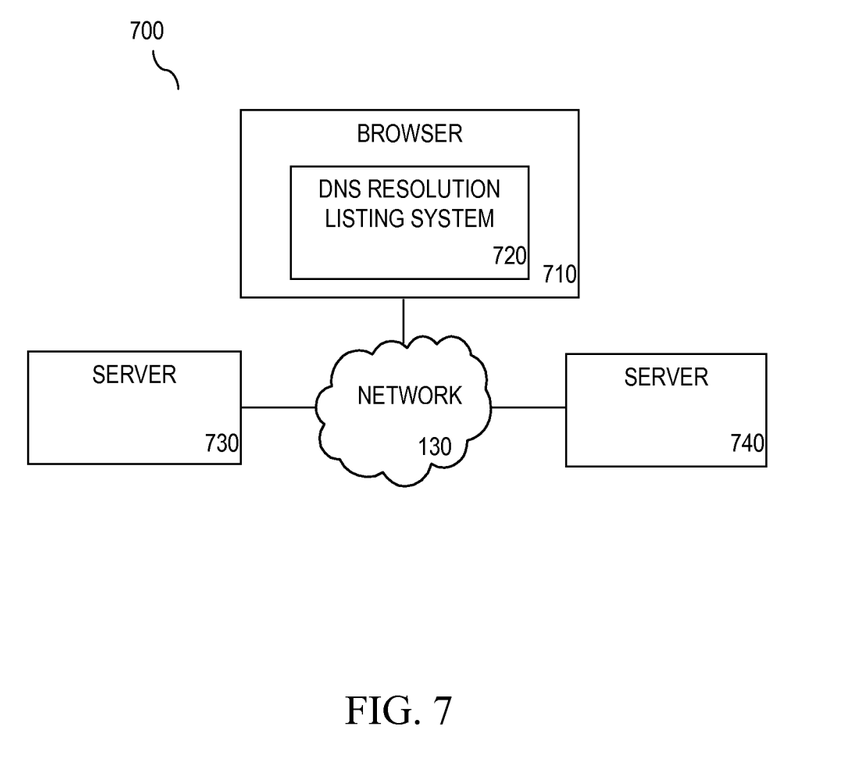
FIG. 7 is a diagram of a system for using trustworthy DNS resolutions, according to an embodiment.

FIG. 7 illustrates an exemplary system 700 for providing a DNS resolution listing system, according to an embodiment. System 700 shows browser 710 and DNS resolution listing system 720, which may be used to connect to server 730 or server 740 over one or more networks 130. Browser 710 and DNS resolution listing system 720 may be coupled directly or indirectly. According to an embodiment, browser 710 may be similar to browser 210 above. Browser 710 may include any conventional web browser such as those that are widely available. Browser 710 may also be a multi-process browser.

Browser 710 and/or DNS resolution listing system 720 may exist within or be executed by hardware in a computing device. For example, browser 710 and/or DNS resolution listing system 720 may be software, firmware, or hardware or any combination thereof in a computing device. Browser 710 and DNS resolution listing system 720 may be located on the same or different computing devices.

According to an embodiment, browser 710 may be configured to connect to another server, such as server 730 or server 740. The connection may be a secure sockets layer (SSL) connection. Browser 710 may obtain a DNS resolution listing for a domain name. The listing may include at least two or more potential DNS resolutions. The potential DNS resolutions may be trusted DNS resolutions.

In an embodiment, browser 710 may receive a DNS resolution listing. Listings may include a bulk listing of potential or plausible IP resolutions, blocks of IP addresses, IP address subnet information or one or more ranges of IP addresses. Listings may be received from a service for a given domain name. For example, if a domain owns, controls or uses all IP addresses in the block 172.24.*.*, then files containing data, such as in an XML encoding, may indicate that all web pages of domain or associated with the domain may plausibly be directed to an any IP address starting with 172.24. An IP address in the range may be selected such as 172.24.1.1 or 172.24.102.5. In an exemplary embodiment, a DNS resolution listing, such as a bulk listing of plausible IP resolutions, may be derived from an application, such as browser 710, recording previous DNS resolutions. These DNS resolutions may have been received from web page header content, from web page content, from a bulk DNS listing service provider, etc.

Figure 8:
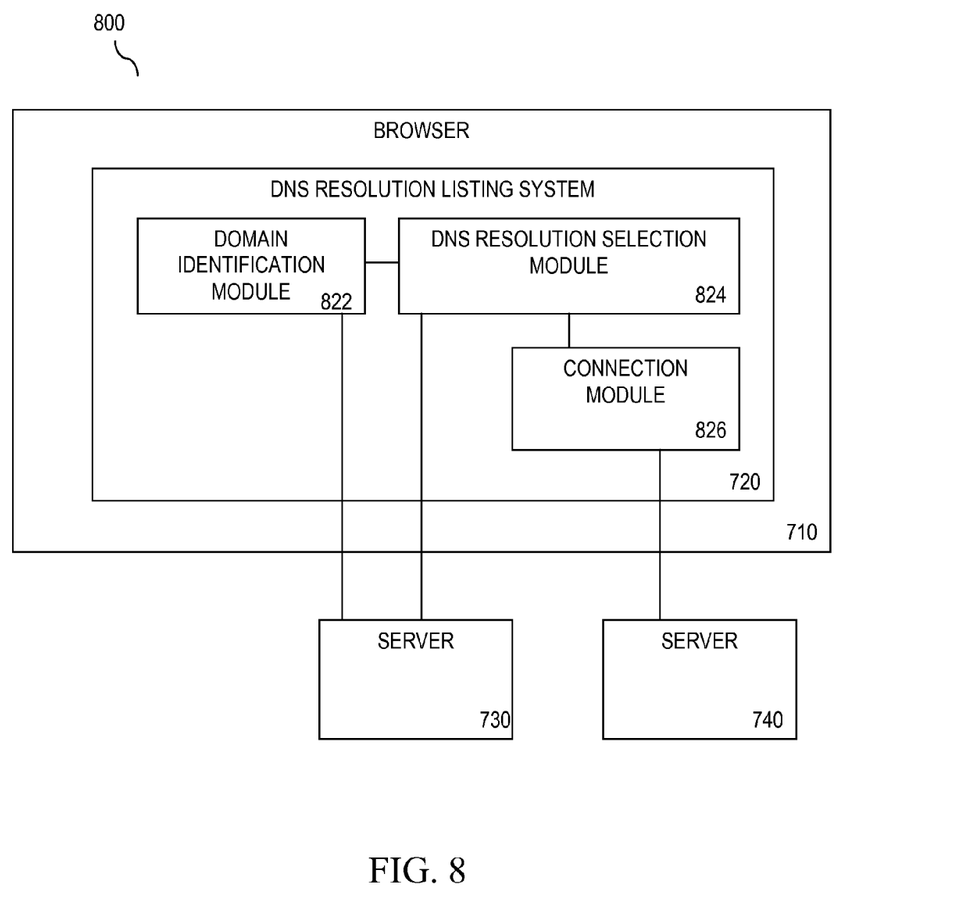
FIG. 8 is a diagram of a system for using trustworthy DNS resolutions, according to an embodiment.

FIG. 8 illustrates an exemplary system 800 for using a DNS resolution listing, according to an embodiment. System 800 includes browser 710 and DNS resolution listing system 720 that may connect to server 730 and/or server 740. DNS resolution listing system 720 may include domain identification module 822, DNS resolution selection module 824 and connection module 826. These components may be coupled together directly or indirectly.

According to an embodiment, domain identification module 822 may be configured to identify a domain name to be resolved. This domain name may be based on a user hostname request. Domain identification module 822 may automatically identify proposed domain names based on scanning or parsing of content. For example, a hypertext markup language (HTML) renderer may scan content and extract suggested domain names for DNS resolution. In some cases, domain names to be resolved may be determined from a web page or search results.

DNS resolution selection module 824 may be configured to obtain and use a DNS resolution listing, according to an embodiment. DNS resolution listings may be obtained from another server. In some cases, a DNS resolution listing may be collected or received from another component or data source such as a bulk listing service provider. DNS resolutions may be obtained without requesting DNS resolution from an operating system DNS cache, local DNS resolver, or a global DNS resolver for the domain name subsequent to identifying the domain name. In other words, a DNS resolution may have already been performed at some time earlier than when the domain name to be resolved is identified. In other cases, a DNS resolution listing may have been generated. An existing DNS resolution listing is used upon identification of the domain name to be resolved rather than requesting resolution after the domain name is identified.

DNS selection module 824 may validate plausibility of the DNS resolution listing using a plausible range list for the domain name. This plausible range list may include one or more hostnames with corresponding DNS resolution range restrictions. Plausible range lists may be obtained from trusted sources prior to obtaining a DNS resolution listing. Plausible range lists may be obtained or formatted similar to DNS resolution listings, as described below. For example, a plausible range list may be a bulk listing of IP addresses or IP address ranges for corresponding domain names. Plausible range lists may also be constructed based on an analysis of past DNS resolutions and validating.

DNS selection module 824 may select a DNS resolution from or based upon the DNS resolution listing. The selection may also be based upon the validation of DNS resolutions. In a further embodiment, other factors such as proximity to the server, age of the listing, history of use of the DNS resolution, reliability of the resolution and availability of IP addresses in a DNS resolution listing may be considered when selecting a DNS resolution or IP address from the DNS resolution listing associated with a domain name. DNS resolution selection module 824 may also be configured to determine whether a DNS resolution is trusted. DNS resolution selection module 824 may also automatically validate the trusted DNS resolution during a secure sockets layer (SSL) connection phase.

Figure 9:
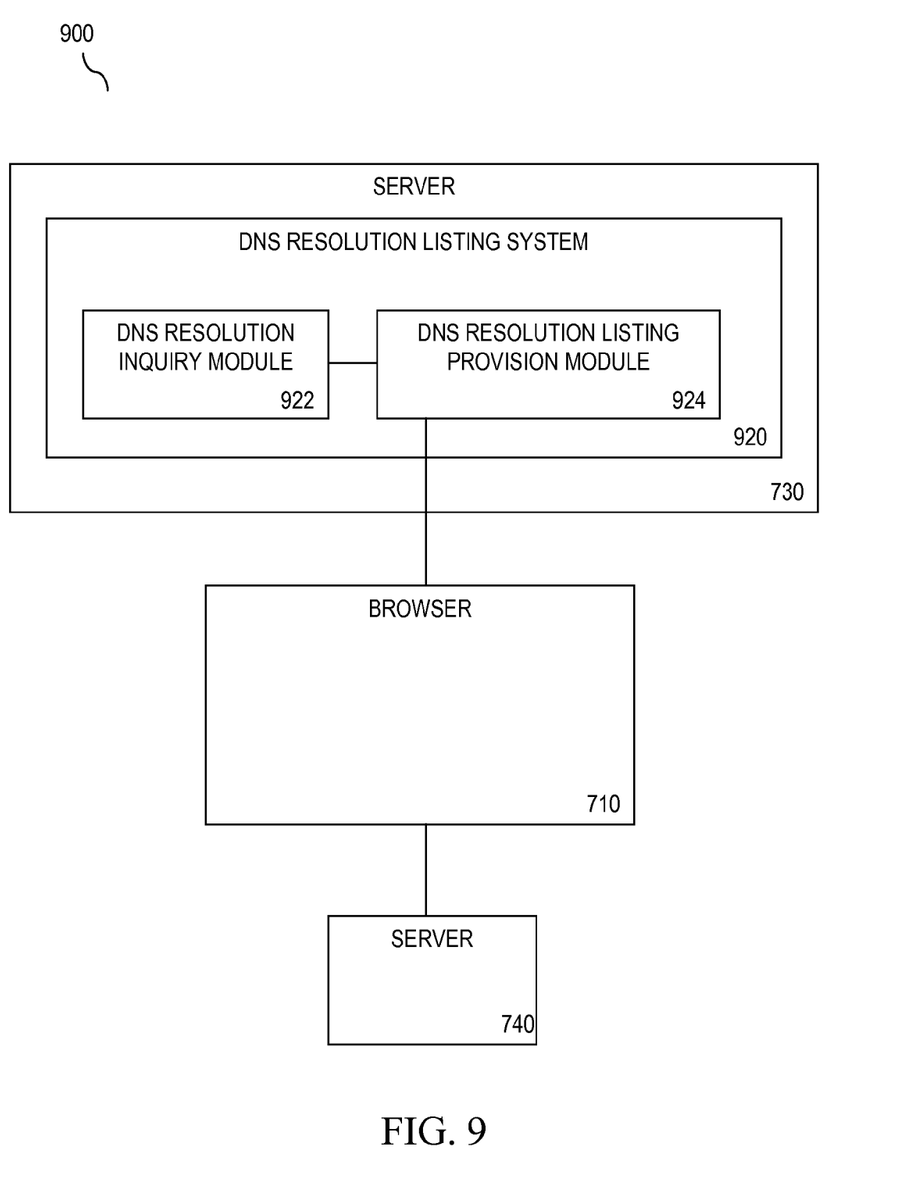
FIG. 9 is a diagram of a system for providing trustworthy DNS resolutions, according to an embodiment.

In an embodiment, content providers, including the provider described in FIG. 9, may supply proposed DNS resolution listings for related items along with content. For example, a web content provider may include metadata suggesting that a given domain may efficiently be resolved to a specific range or list of IP addresses. In an exemplary embodiment, a proposed resolution listing may be included in a header, such as an HTTP header, or it may be provided by directly augmenting content, such as the HTML content. For example, a header such as X-DNSRESOLUTION=(www-.google.com, 172.24.0.7, 172.24.0.9, 172.24.0.10, 172.24.0.14), X-DNSRESOLUTION=(www.google.com, 172.24.0.7-172.24.0.200) or X-DNSRESOLUTION=(www.google.com, 172.24.*.* may be provided to propose a DNS resolution of www.google.com to the specified IP address. Similarly, in an exemplary embodiment, in HTML content, a link such as <a href=www.google.com> may be augmented to <a href=www.google.com dns=172.24.*.*> to propose a resolution of www.google.com. Therefore, in an embodiment, selection module 824 may obtain a DNS resolution listing for a domain name from within header or web page content. Other variations and combinations of HTML augmentation are foreseeable beyond this particular example.

In an embodiment, content providers may supply proposed DNS resolution listings for the domain used to acquire the content. In another exemplary embodiment, content from www.google.com may include a proposed DNS resolution listing for www.google.com. In some embodiments, such proposed DNS resolutions may be added to an accumulated list of plausible addresses. In still other embodiments, these proposed DNS resolutions may include a time-to-live (TTL) value. The TTL is an expiration time, after which the list should not be relied upon.

In an embodiment, selection module 826 may use content-provided resolutions to connect to domain addresses. For example, connection module 826 may connect to a domain using a DNS resolution selected by selection module 824. In some embodiments, resolutions that are plausible by virtue of being implied by a bulk listing of plausible addresses may be selected. In some cases, resolutions that are plausible by inclusion in an accumulated list of plausible addresses may be selected. In other cases, resolutions that are plausible by inclusion in an accumulated list of plausible addresses may be selected. An attempted connection to a content-suggested, and plausible resolution, may be performed in parallel with an independent DNS resolution of the indicated host name. If an attempted connection to a content-suggested resolution does not succeed, an application may wait for a current DNS resolution, and retry a connection to that resolution, before considering the host unreachable. In other embodiments, a DNS resolution from the DNS resolution listing that is closer to the server domain than a current DNS resolution for the domain name may be deemed more plausible or highly plausible.

In some cases, DNS resolutions may only be plausible if they are derived from authoritative DNS servers. Selection module 824 may also only consider DNS resolutions plausible if they are received from servers from known points-of-presence. In a further embodiment, DNS resolutions may only be deemed "trusted" if they are derived from known or trusted servers. In another embodiment, DNS resolutions may only be deemed "trusted" if they are derived from authoritative DNS servers. In some cases, certain resolutions in a DNS listing may be marked depending on attributes such as origination, age or trustworthiness.

In some embodiments, selection module 824 may give preference to a content-provided address, over a DNS resolver provided address. For example, if content from www.google.com proposed an IP address of 172.24.0.7, while a previous DNS resolution provided a resolution of 172.24.0.8, the application may give preference to the IP address 172.24.0.7. In other embodiments, a preference may be given to applicable DNS resolutions over content provided resolutions. In another embodiment, a preference may be given to applicable DNS resolutions resolved from multiple points-of-presence. According to a further embodiment, selection module 824 may use an IP address not explicitly provided in a range but predicted upon other information or past use.

In an embodiment, selection module 824 may accumulate a list of plausible resolutions. In an exemplary embodiment, after a resolution of a name to an IP address has been made by an application, it may record the IP address as a plausible address, with an expiration value that is longer than the TTL value provided with the resolution. For example, a website having a TTL value of 5 minutes or less, may be recorded as being plausible for a day or week. In another embodiment, DNS resolution selection module 824, may accumulate and retain a generic list of plausible resolutions for a specific domain name. Selection module 824 may also accumulate a bulk DNS resolution listing of the most frequently visited websites by a user. In another exemplarily embodiment, selection module 824 may automatically accumulate a bulk DNS resolution listing for a list of generic or frequently visited (e.g. popular) Internet websites.

In an embodiment, DNS resolution selection module 824 may rely upon a bulk listing service provider to provide a bulk listing of plausible DNS resolutions for a given domain name. The bulk listing service provider may also provide a bulk listing of plausible DNS resolutions for a plurality of domain names. Furthermore, the bulk listing service provider may provide one or more blocks of DNS addresses corresponding to one or more domain names. The bulk listing service provider may routinely provide updates for such listings. For example, routine updates may be provided to system 720 at regular time intervals, such as weekly, daily, hourly, etc. In some embodiments, a bulk listing service provider may provide updates resolved from a previously provided listing. For example, the bulk listing service provider may determine what version is possessed by the browser 710, and send only the changes needed to create a new version of the listing. In an embodiment the resolutions contained in the bulk listing may contain a TTL value. In another embodiment, individual resolutions (or items) in a listing may have individual TTL values.

Connection module 826 may be configured to establish a connection to another host or server with an obtained or provided DNS resolution, according to an embodiment. An SSL connection may also be established. If a trusted DNS resolution is provided, connections to sub-resource servers for a domain name may be initiated. In some embodiments, system 720 may rely on a bulk listing of plausible IP resolutions for a given domain name provided by DNS resolution selection module to initiate connections to a host. In some cases, such bulk listings of plausible IP resolutions may be used only to initiate SSL connection, such as HTTPS content acquisitions. For example, connections to hosts via HTTP connection may ignore resolutions provided in content. In an exemplary embodiment SSL connections are initiated with DNS resolutions that are deemed "trusted."

FIG. 9 illustrates an exemplary system 900 for providing a DNS resolution listing system, according to an embodiment. System 900 may include browser 710, coupled to server 730 and server 740. Server 730 may include DNS resolution listing system 920, which may include DNS resolution inquiry module 922 and DNS resolution listing provision module 924. These components may be coupled together directly or indirectly. DNS resolution inquiry module 922 may perform at least the functions of domain identification module 822.

DNS resolution inquiry module 922 may inquire about DNS resolution from DNS servers, such as authoritative DNS servers. DNS resolutions may be collected by inquiries about IP address ranges or blocks. Inquiry module 922 may request DNS resolution from multiple points-of-presence. Inquiry module 922 may acquire DNS resolutions as described above for the bulk listing provider. DNS resolutions may be acquired from only trusted sources so that trustworthy DNS resolutions may be provided.

DNS resolution listing provision module 924 may be configured to combine acquired DNS resolutions or DNS resolution ranges into a DNS resolution listing. Generating a listing may include creating a new listing or updating an existing listing. This listing may be also generated or compiled based on current and past information about DNS resolutions. This information may include associations between IP addresses and domain names.

DNS resolution listing provision module 924 may be configured to provide DNS resolution listings. Listings may be provided in web content, web headers, or in reference links. In some cases, DNS resolution listings may be provided in a simple data transmission. Provision module 924 may include the functionality of the bulk listing provider described above. DNS resolution listing provision module 924 may obtain DNS resolutions form other data sources or from requesting DNS resolution prior to identification of a domain name to be resolved. According to an embodiment, web servers, such as HTTP or HTTPS servers, may augment content by including one or more DNS resolutions with the content served as a page. Web search results that included SSL links may be augmented to provide possible IP addresses for given hosts. DNS resolution listing provision module 924 may provide trusted DNS resolution listings. DNS resolutions listing provision module 924 may also provide plausible range lists.

In some embodiments extracted resolutions may be recorded by system 720 or system 920 for possible future use, such as in a DNS resolution listing. Resolutions may be searched for when the need for a resolution has manifested itself. In an exemplary embodiment, these extracted resolutions may include IP subnet addresses. For example, a DNS resolution may be needed when a connection to a host is required, such as when a user clicks on a web link, or when a sub-resource of a page, such as an image, needs to be fetched. TTL expiration values may also be included with embedded DNS resolutions. In a further embodiment, plausible IP addresses may be determined or extrapolated based on existing DNS resolution listing information.

Figure 10:
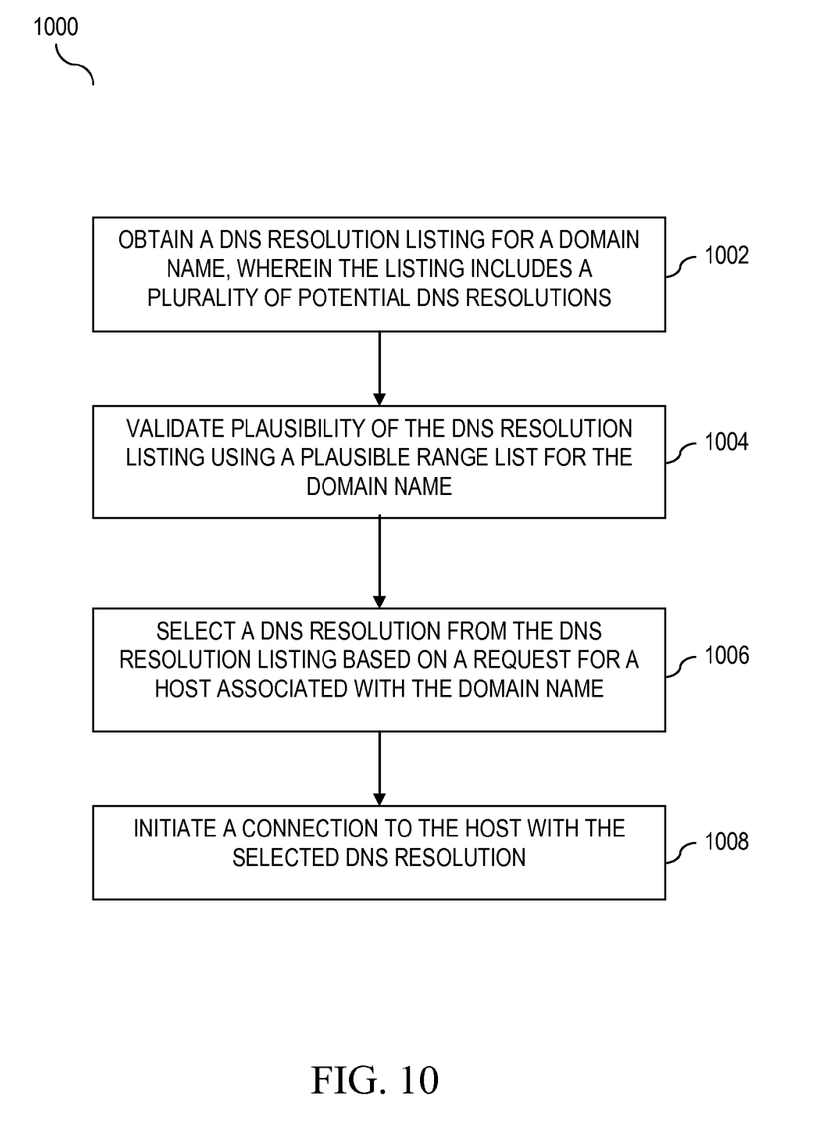
FIG. 10 is a flowchart illustrating a method for using trustworthy DNS resolutions, according to an embodiment.

FIG. 10 illustrates an exemplary method 1000 for using trustworthy DNS resolution listings, according to an embodiment. In step 1002, a DNS resolution listing for a domain name is obtained. The listing may include or describe a plurality of potential DNS resolutions. This step may be performed by system 720. In some cases, the domain to be resolved may be identified or provided to DNS resolution listing system 720. Systems such as 920 may provide the DNS resolution listings.

In step 1004, the plausibility of the DNS resolution listing is validated using a plausible range list for the domain name. The plausible range list may have been pre-cached or obtained at an earlier time. The plausible range list may also be built into the system or established at an earlier date. The plausible range list may be considered trustworthy. Successful validation of a DNS resolution listing may indicate that a DNS resolution listing is trustworthy and that successful connection using a DNS resolution listing is plausible. In many cases, plausible DNS resolutions may also be relied on for secure connections, such as SSL.

In step 1006, a DNS resolution from the DNS resolution listing is selected based on a request for a host associated with the domain name. This step may be performed by DNS resolution selection module 824. In step 1008, the selected DNS resolution may be used to initiate a connection with the host. This step may be performed by DNS resolution selection module 824 or connection module 826.

Figure 11:
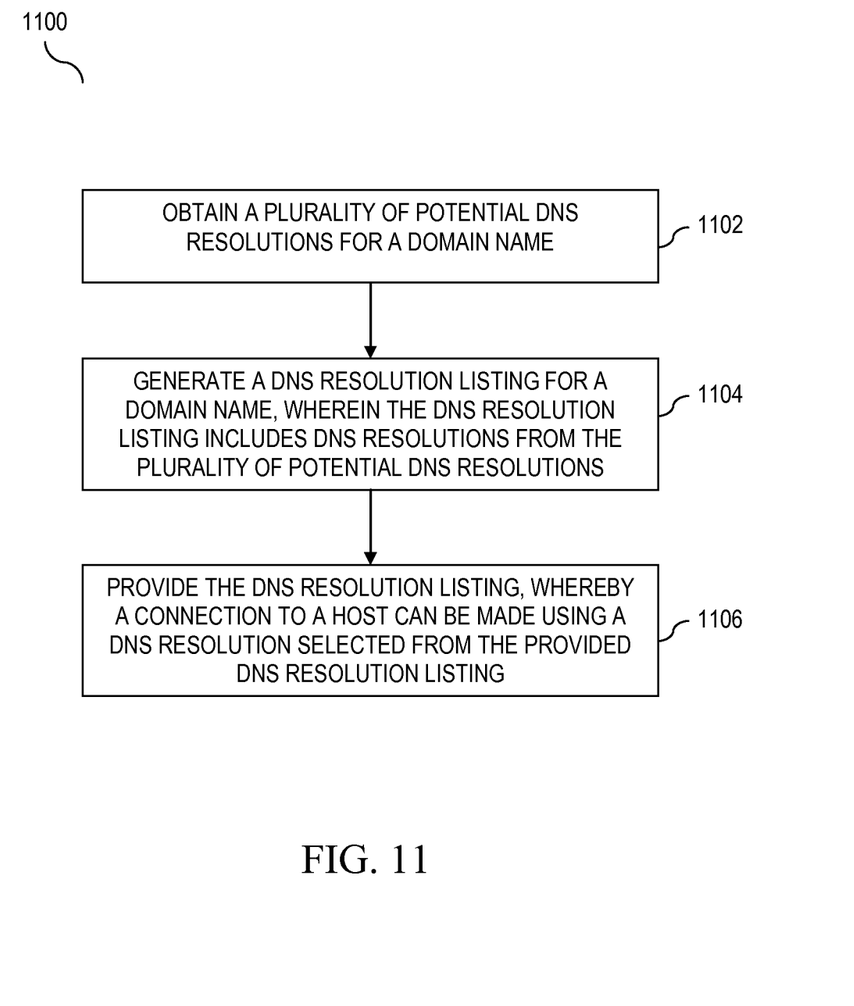
FIG. 11 is a flowchart illustrating a method for providing trustworthy DNS resolutions, according to an embodiment.

FIG. 11 illustrates an exemplary method 1100 for providing trustworthy DNS resolutions, according to an embodiment. In step 1102, multiple potential DNS resolutions may be obtained for a domain name. In an exemplary embodiment, DNS resolution inquirer 922 may perform this step.

In step 1104, a DNS resolution listing is generated for a domain name. The DNS resolution listing includes DNS resolutions from the plurality of potential DNS resolutions. This step may be performed by inquirer 922 or DNS resolution listing provision module 924.

In step 1106, the DNS resolution listing may be provided. A receiving client or application may then use the provided DNS resolution listing to initiate a connection to a host associated with the domain name. In an exemplary embodiment, the selected DNS resolution may be deemed a trusted DNS resolution as discussed above. This trusted DNS resolution may also be used in a SSL connection or for sub-resources requiring an SSL connection. Trusted DNS resolutions listings may have been validated using plausible range lists. Plausible range lists may also be provided.

The approaches discussed above may benefit web applications that require secure connectivity. Any time there is a need to link to SSL content, such approaches may be used. Perceived latency may be reduced as the steps needed to establish a secure connection are fewer.

Aspects of the embodiments for exemplary systems 200-400 and 700-900; as well as methods 500-600 and 1000-1100; or any part(s) or function(s) thereof may be implemented using hardware, software modules, firmware, tangible computer readable or computer usable storage media having instructions stored thereon, or a combination thereof and may be implemented in one or more computer systems or other processing systems.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for using Domain Name Service (DNS) resolution comprising:
    obtaining, by a client device, web page content from a content provider;
    analyzing, by the client device, the web page content from the content provider to identify a domain name of a uniform resource locator (URL) and a DNS resolution for the domain name embedded in the web page content;
    determining, by the client device, that the URL is a secure hypertext transport protocol (HTTPS) URL;
    initiating, by the client device, a secure socket layer (SSL) connection to a host associated with the DNS resolution; and
    validating, by the client device, the DNS resolution during the SSL connection.

2. The method of claim 1, wherein the obtaining includes obtaining the DNS resolution from within an HTTP header or web page content.

3. The method of claim 1, wherein the obtaining includes obtaining one or more blocks of IP addresses corresponding to the domain name.

4. The method of claim 1, wherein the obtaining includes obtaining an IP subnet address corresponding to the domain name.

5. The method of claim 1, wherein the analyzing comprises analyzing an HTML tag field in the web page content to obtain the DNS resolution, the HTML tag field specifying the domain name and one or more corresponding IP addresses.

6. The method of claim 1, wherein the analyzing comprises analyzing an HTTP header in the web page content to obtain the DNS resolution, the HTTP header specifying the domain name and one or more corresponding IP addresses.

7. The method of claim 1, wherein the initiating comprises initiating the SSL connection without the client device requesting a DNS resolution for the domain name from an operating system DNS cache, local DNS resolver, or a global DNS resolver.

8. The method of claim 1, wherein the obtaining comprises obtaining the web page content from a content provider via another SSL connection.

9. A system for using Domain Name Service (DNS) resolutions comprising:
    a memory; and
    at least one processor coupled to the memory and configured to:
    obtain web page content from a content provider;
    analyze the web page content from the content provider to identify a domain name of a uniform resource locator (URL) and a DNS resolution for the domain name embedded in the web page content;

determine that the URL is a secure hypertext transport protocol (HTTPS) URL;

initiate a secure socket layer (SSL) connection to a host associated with the DNS resolution; and validate the DNS resolution during the SSL connection.

10. The system of claim 9, wherein the processor configured to obtain is configured to obtain the DNS resolution from within an HTTP header or web page content.

11. The system of claim 9, wherein the processor configured to obtain is configured to obtain one or more blocks of IP addresses corresponding to the domain name.

12. The system of claim 9, wherein the processor configured to obtain is configured to obtain an IP subnet address corresponding to the domain name.

13. A non-transitory computer-readable device having instructions stored thereon that, when executed by at least one computing device, cause the at least one computing device to perform operations for using Domain Name Service (DNS) resolutions, the operations comprising:

obtaining, by the at least one computing device, web page content from a content provider;

analyzing, by at least one computing device, the web page content from the content provider to identify a domain name of a uniform resource locator (URL) and a DNS resolution for the domain name embedded in the web page content;

determining, by the at least one computing device, that the URL is a secure hypertext transport protocol (HTTPS) URL;

initiating, by the at least one computing device, a secure socket layer (SSL) connection to a host associated with the DNS resolution; and validating, by the at least one computing device, the DNS resolution during the SSL connection.

14. The computer-readable device of claim 13, wherein the obtaining includes obtaining the DNS resolution from within an HTTP header or web page content.

15. The computer-readable device of claim 13, wherein the obtaining includes obtaining one or more blocks of IP addresses corresponding to the domain name.

16. The computer-readable device of claim 13, wherein the obtaining includes obtaining an IP subnet address corresponding to the domain name.

\* \* \* \* \*